(12) United States Patent
Case et al.

(10) Patent No.: US 8,082,819 B2
(45) Date of Patent: Dec. 27, 2011

(54) FINGER OPERATED THROTTLE

(75) Inventors: Jeff A. Case, West Valley City, UT (US); Wallace Day, Payson, UT (US)

(73) Assignee: Jeff A. Case, West Valley City, UT (US)

( * ) Notice: Subject to any disclaimer, the term of this patent is extended or adjusted under 35 U.S.C. 154(b) by 665 days.

(21) Appl. No.: 12/204,512

(22) Filed: Sep. 4, 2008

(65) Prior Publication Data

US 2009/0107280 A1 Apr. 30, 2009

Related U.S. Application Data

(60) Provisional application No. 60/970,777, filed on Sep. 7, 2007.

(51) Int. Cl.
*F16C 1/12* (2006.01)
*G05G 11/00* (2006.01)
(52) U.S. Cl. .......................... 74/501.6; 74/489
(58) Field of Classification Search ............... 74/488, 74/489, 502.2; 180/315, 335, 336; 123/400, 123/403
See application file for complete search history.

(56) References Cited

U.S. PATENT DOCUMENTS

| | | | |
|---|---|---|---|
| 5,775,167 A | 7/1998 | Maietta | |
| 6,167,776 B1 | 1/2001 | Cossette | |
| 6,551,153 B1 | 4/2003 | Hattori | |
| 6,658,965 B2 | 12/2003 | Allen | |
| 7,735,392 B2 * | 6/2010 | Poulos et al. | 74/502.2 |
| 2003/0150287 A1 * | 8/2003 | Lev-Ran | 74/488 |
| 2004/0163485 A1 * | 8/2004 | Ginnetti | 74/488 |

* cited by examiner

*Primary Examiner* — Thomas R Hannon
*Assistant Examiner* — Phillip A Johnson
(74) *Attorney, Agent, or Firm* — Workman Nydegger

(57) ABSTRACT

A finger throttle for motorized vehicles having thumb throttles with thumb operated levers. The finger throttle includes a housing, a linkage assembly, and a finger operated lever. The housing is configured to mount on the thumb throttle housing and the linkage assembly is configured to engage the thumb throttle linkage assembly. The finger operated lever is linked to the linkage assembly such that moving the finger operated lever moves the linkage assembly, which in turn moves the thumb throttle linkage assembly. The operator can use the finger operated lever or the thumb operated lever to control the engine speed or can use both levers concurrently to do so.

21 Claims, 9 Drawing Sheets

FINGER OPERATED THROTTLE

CROSS-REFERENCE TO RELATED APPLICATIONS

This application claims the benefit of U.S. Provisional Patent Application Ser. No. 60/970,777, filed Sep. 7, 2007 and entitled THE THUMB SAVER THROTTLE, which application is incorporated herein by specific reference it its entirety.

BACKGROUND OF THE INVENTION

1. The Field of the Invention

The present invention relates to hand operated throttles for motorized vehicles.

2. The Relevant Technology

Many recreational motor vehicles, such as all-terrain vehicles (ATVs), snowmobiles and personal watercraft require the operator to activate a thumb operated throttle to control the engine. The thumb throttle is usually mounted on or near the right handle bar and has a lever disposed below and behind the right hand grip. As the rider grips the right hand grip, the rider's thumb operates the throttle by pushing the throttle lever from a closed or idle position toward the handle bar and holding it there. The thumb throttle is designed to provide a range of speeds as the lever is pushed forward. If the lever is fully pushed forward with the thumb to the open position, the throttle is held fully open and the highest speeds can be reached. Of course, holding the throttle in between the idle and open positions produces an intermediate level of speed generally proportional to the distance the lever has been pushed.

For safety reasons, one or more springs is used to force the throttle back to the idle position if the throttle lever is released, thus reducing power to the engine. As a result, if the rider releases his or her grip on the throttle lever, the vehicle will automatically slow down or stop. Although the spring provides an important safety function, it also causes fatigue in the rider. Holding the throttle lever against the force of the spring by the thumb can be very tiresome, especially on long trips. This discomfort can be exacerbated by environmental or other variables. For example, when riding a snowmobile or ATV, the outside temperature can be very low, adding to the thumb's discomfort. Moreover, people with smaller hands suffer more because the thumb must be stretched out to grip the throttle. This puts additional strain on the rider.

Several solutions to this problem have been devised. The first is to lengthen the thumb lever and/or reduce the amount of force required to push the lever. While this may help to slow the onset of thumb discomfort, it does not prevent it. The second is to replace the immovable hand grip with one that can rotate about the handlebar. This rotatable hand grip has a projection that pushes on the thumb throttle as the hand grip is rotated, thus allowing the motor vehicle to have a motorcycle-style throttle. Although this makes riding more comfortable, it also makes it more dangerous. The solid grip of the rigid hand grip is lost and makes the operator more susceptible to losing his or her grip while riding, especially during the jostling that can easily occur.

Accordingly, what is needed are finger actuated throttles that can be attached to or otherwise combined with thumb throttles to minimize the discomfort caused by current thumb throttles.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like parts are given like reference numerals.

DETAILED DESCRIPTION OF THE PREFERRED EMBODIMENTS

As noted above, the present invention is directed to hand operated throttles for motorized vehicles. Examples of such motorized vehicles include ATVs, snowmobiles, and personal watercraft. For simplicity, the following discussion will refer to throttles attached to ATVs. This is not to be limiting as it is appreciated that snowmobiles, personal watercraft, and other motorized vehicles that used hand operated throttles can utilize throttles according to the present invention in substantially the same way as an ATV.

Furthermore, for purposes of this application, the following definitions will be used:

1. Directional words and phrases used herein, such as "right," "left," "forward," "in front of," "behind," and the like all use as a frame of reference the standard directions used with motorized vehicles unless specifically stated otherwise in the application. As such, reference to "left" and "right" of any particular object refer to positions that are respectively left of or right of the object as viewed from behind the vehicle. For example reference to the "right hand grip" refers to the hand grip on the right side of the vehicle as seen when standing behind the vehicle. The "right hand grip" is the portion of the handlebar that the operator grips with his right hand while riding.

Similarly, reference to "in front of" the handlebar refers to the area that is closer to the commonly known front portion of the vehicle than the handlebar. Conversely, reference to "behind" the handlebar refers to the area that is closer to the commonly known rear portion of the vehicle than the handlebar.

2. The word "finger" or derivative thereof is defined herein as any of the terminal members or digits of the hand other than the "thumb." That is, for purposes of this application, the thumb is not considered a finger. Thus, when reference is made to the "finger" or "fingers", the thumb is to be excluded.

With these definitions in mind, we now turn to a description of various embodiments of the present invention.

Figure 1:
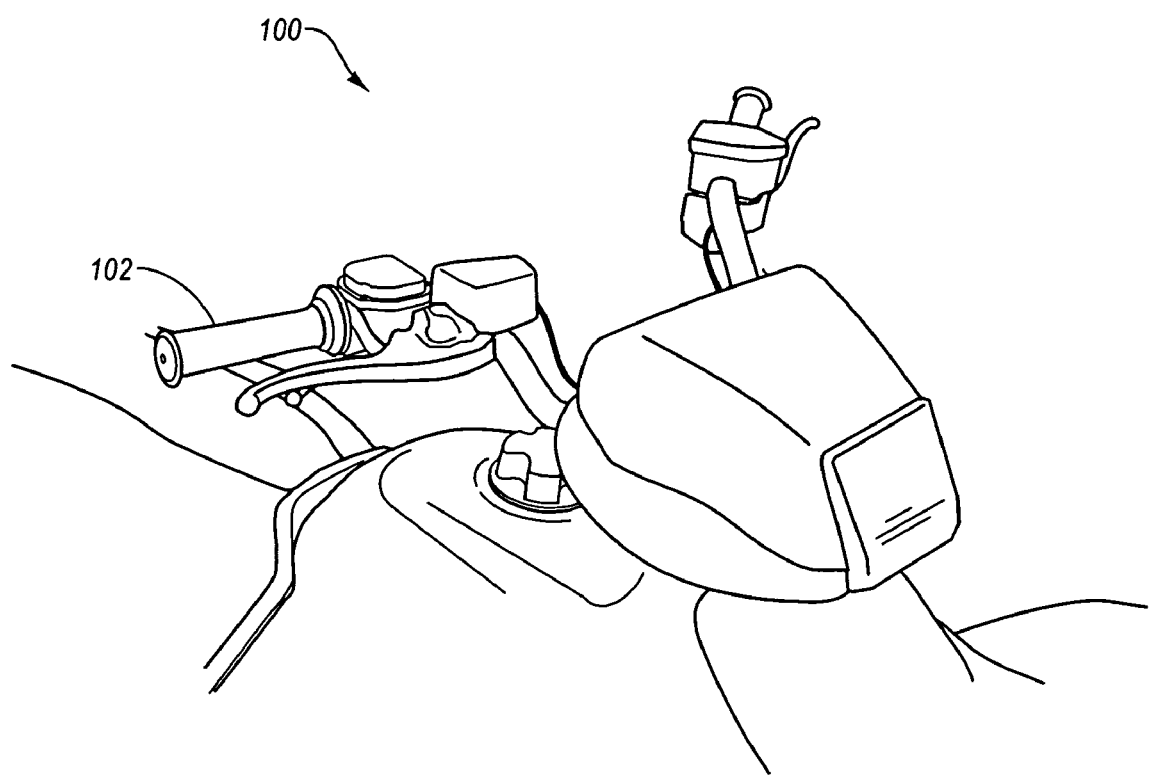
FIG. 1 is a front view of an ATV incorporating one embodiment of a finger throttle according to the present invention.
Figure 2:
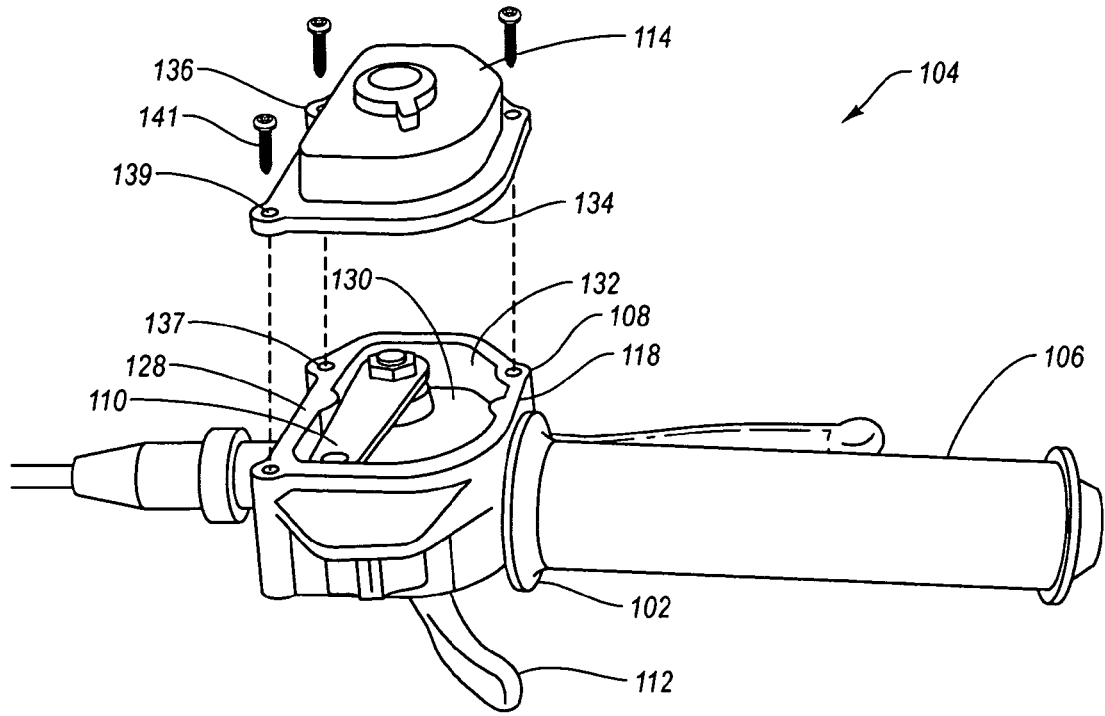
FIG. 2 is a top rear view of a portion of a handlebar of the ATV depicted in FIG. 1, showing a conventional thumb throttle with the cover removed to show details inside the thumb throttle housing.

Depicted in FIG. 1 is a conventional ATV 100 having one embodiment of the invention mounted to the right handlebar 102 thereof. Turning to FIG. 2, an example of a conventional thumb throttle 104 that typically comes as stock equipment on many ATVs, snowmobiles and personal watercraft, is shown mounted on or near the right hand grip 106. As discussed in more detail below, thumb throttle 104 is designed so that an operator of the ATV or other vehicle controls the engine by depressing a thumb lever. Thumb throttle 104 generally comprises a housing 108 having a throttle linkage assembly 110 disposed therein, a throttle lever 112 attached to the linkage assembly 110, and a throttle cover 114 removably mounted on the housing 108 so as to enclose the linkage assembly 110.

Figure 3:
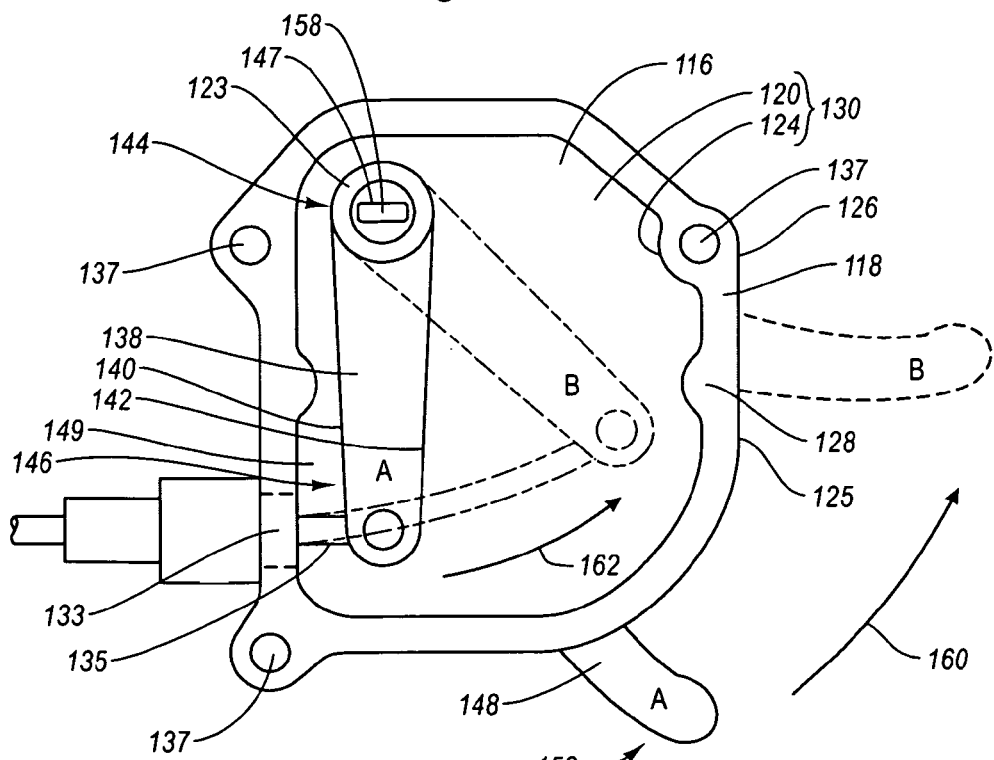
FIG. 3 is a top plan view of the thumb throttle housing depicted in FIG. 2, showing the open and closed positions of the thumb throttle linkage.

Turning to FIG. 3 in conjunction with FIG. 2, housing 108 has a floor 116 with a perimeter sidewall 118 extending upward therefrom. Floor 116 has an interior surface 120 and an opposing exterior surface 122 (see FIG. 7) extending to a perimeter edge 125. Exterior surface 122 is typically configured to mount to right handlebar 102 at or near hand grip 106. This can be done in any conventional method, such as by fasteners, strap, adhesive, or other methods known in the art.

Figure 4:
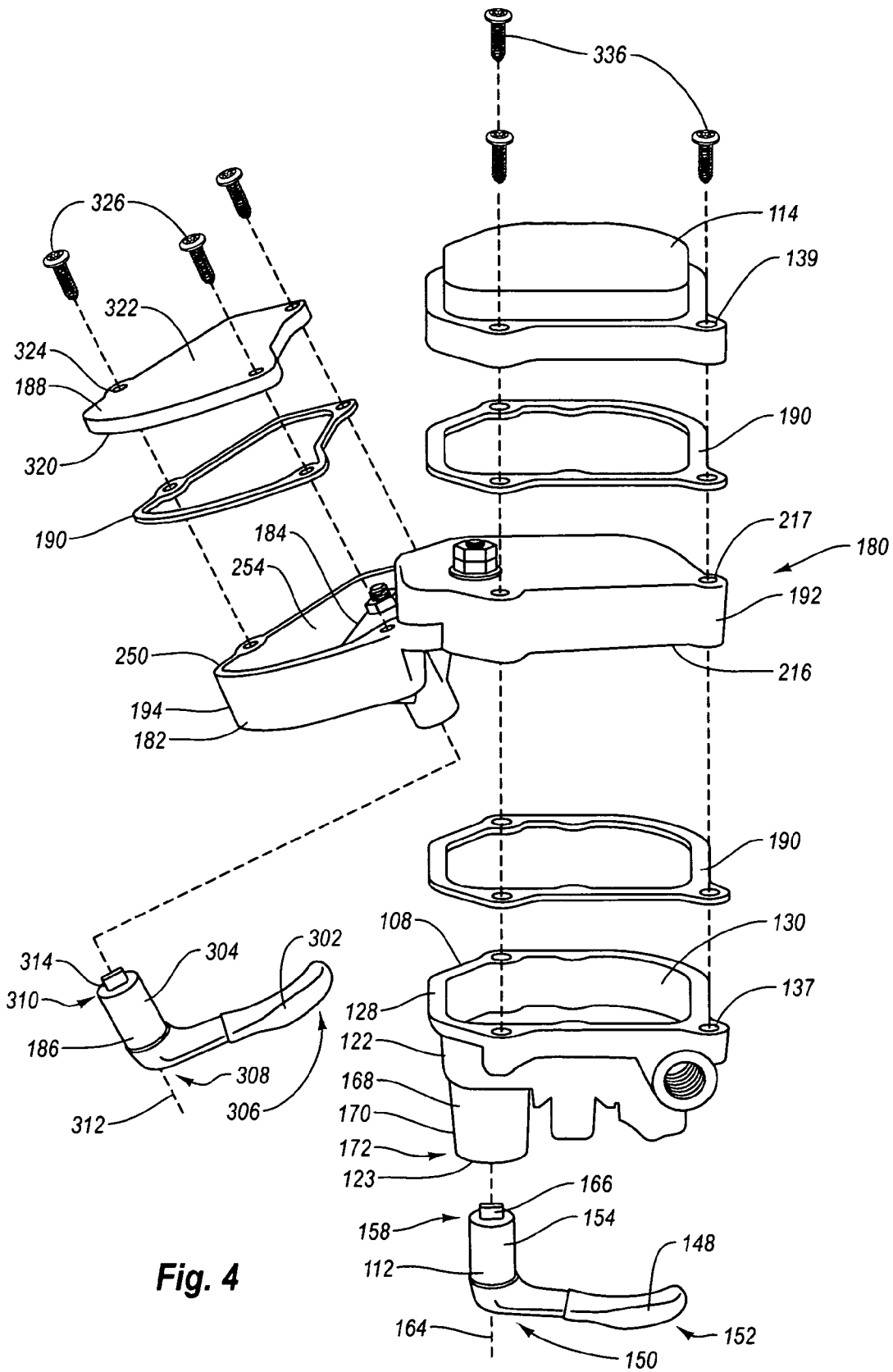
FIG. 4 is an exploded side view of a throttle assembly including a thumb throttle and a finger throttle according to one embodiment of the present invention.

Turning to FIG. 4, projecting substantially normally from the exterior surface 122 of floor 116 is a tube-like projection 168. Projection 168 comprises a sidewall 170 extending from the exterior surface 122 to a spaced apart distal end 172. Sidewall 170 bounds a passageway 123 that extends completely through projection 168 and floor 116. It is through this passageway 123 that the thumb throttle lever 112 attaches to thumb throttle linkage assembly 110, as discussed in more detail below.

Returning to FIGS. 2 and 3, perimeter sidewall 118 has an interior surface 124 and an opposing exterior surface 126 that extend from floor 116 to a top surface 128 that is generally planar. The interior surfaces 120 and 124 together bound a cavity 130 that is open at the top end 132 of the cavity 130. Perimeter sidewall 118 bounds a passageway 133 extending all the way through sidewall 118 between the interior and exterior surfaces 126 and 128. This passageway 133 is used to pass a throttle cable 135 through to attach to the throttle linkage assembly 110, as discussed below. This throttle cable is operationally attached to the engine throttle mechanism as known in the art to cause more or less fuel to be fed into the engine. Perimeter sidewall also includes various threaded screw holes 137 having openings on the top surface 128 for securing throttle cover 114 thereto.

Throttle cover 114 has an interior surface 134 and an opposing exterior surface 136. Throttle cover 114 is removably attachable to sidewall 118 at top surface 128 so that when attached, interior surface 134 further bounds and encloses cavity 130 at the top surface 128 of the cavity 130. In the depicted embodiment, throttle cover 114 also includes various through bores 139 that align with the screw holes 137 formed on top surface 128 of the sidewall 118 when the cover 114 is mounted thereon. Throttle cover 114 can be attached to sidewall 118 by inserting screws 141 as are known in the art through the through bores 139 and screwing the screws 141 into screw holes 137. Other fastening or attachment means known in the art can alternatively be used. Although not required, a gasket 190 (see FIG. 4) can also be positioned between the cover 114 and the top surface 128 of the perimeter sidewall 118 to help seal the connection and/or to provide a better fit.

Housing 108 and throttle cover 114 can be made of hard plastic, metal, or other rigid material, as is known in the art.

Returning to FIG. 4, throttle lever 112 comprises a lever arm 148 that is rotatable about a shaft 154. Lever arm 148 extends from a first end 150 to a spaced apart second end 152. Shaft 154 projects substantially normally from first end 150 of lever arm 148, to a spaced apart distal end 158 along a central longitudinal axis 164. A key 166 or other attachment means is disposed at distal end 158. Throttle lever 112 is positioned so that lever arm 148 is disposed outside of and below housing 108 while shaft 154 passes through passageway 123 and into cavity 130 so as to attach to throttle linkage assembly 110. A key 166 or other attachment means are disposed on distal end 158 of shaft 154 to aid in this attachment. Lever arm 148 can be made of hard plastic, metal, or other rigid material, as is known in the art.

Returning to FIG. 3, throttle linkage assembly 110 comprises a rigid linkage arm 138 having an inner edge 140 and an opposing outer edge 142 extending from a first end 144 to a spaced apart second end 146. Disposed at the first end 144 of linkage arm 138 is an attachment means 147 that is mateable with the key 166 or other attachment means disposed on shaft 154. Linkage arm 138 is disposed within cavity 130 such that first end 144 is disposed over passageway 123 and rigidly attached to distal end 158 of shaft 154 using the attachment means 147. As such, when lever arm 148 is pivoted about shaft 154, linkage arm 138 is also caused to pivot about shaft 154, and vice versa. Linkage arm 138 can be attached to shaft 154 via threaded attachment, adhesive, keyed attachment, or any other types of attachment known in the art. As a result of this attachment, first end 144 remains disposed over passageway 123 while linkage arm 138 pivots about first end 144 from a first idle position A to a second open position B.

The second end 146 of linkage arm 138 is designed to receive and secure throttle cable 135. As noted above, throttle cable 135 operationally attaches to the engine throttle mechanism as known in the art to cause more or less fuel to be fed into the engine. Linkage arm 138 can be made of hard plastic, metal, or other rigid material, as is known in the art.

During normal use of the ATV or other vehicle having a thumb throttle as described above, the throttle is used to control the engine and thus the speed of the vehicle. When the vehicle is first started or the operator desires the engine to idle, the linkage arm 138 and lever arm 148 are positioned in the idle position, denoted by "A" on FIG. 3. Note that a narrow space 149 is formed between the inner edge 140 of linkage arm 138 and the interior surface 124 of sidewall 118. As noted above, a spring or other biasing device (not shown) is typically used to bias the linkage arm 138 and lever arm 148 to this idle position when no operator force is present on the lever arm 148.

When the operator desires to go faster, the operator pushes forward on lever arm 148, causing the lever arm 148 to pivot about shaft 154 in the direction denoted by arrow 160. This causes linkage arm 138 to correspondingly pivot about shaft 154, in the direction denoted by arrow 162, in turn causing cable 135 to move with the second end 146 of linkage arm 138. This direction of movement of cable 135 causes more gas to be fed to the engine, causing the ATV to accelerate.

If the operator desires to open up the engine throttle as much as possible to go as fast as possible, the operator pushes the lever arm 148 to rotate in the direction of arrow 160 to the fully open position, denoted by "B" on FIG. 3. Linkage arm 138 also rotates to position B, causing cable 135 to be moved to the position that will cause the largest amount of gas to be fed to the engine. To decelerate, the operator simply releases pressure on the lever arm 148 and the spring or other biasing device causes the linkage arm 138 to rotate back (i.e. in the opposite direction of arrow 162) towards the idle position A. Because of its attachment to linkage arm 138, lever arm 148 also rotates back to idle position A.

As noted above, thumb throttle 104 typically comes as stock equipment on many ATVs, snowmobiles and personal watercraft. It is appreciated that there are many variations to the thumb throttle discussed above for the various different models and manufacturers. The thumb throttle depicted above is exemplary only. Other thumb throttles that work similarly as are known in the art can also be used with the present invention.

Returning to FIG. 4, one embodiment of a finger throttle 180 according to the present invention is shown that can be placed between the cover 114 and housing 108 of the thumb throttle 104.

Finger throttle 180 comprises a housing 182 having a linkage assembly 184 disposed therein and a throttle lever 186 projecting therefrom. A cover 188 is removably mounted on the housing 182 so as to enclose at least a portion of the linkage assembly 184 and various gaskets 190 can be included if desired.

Housing 182 comprises a first section 192 and a second section 194 disposed side-by-side and attached together via a common wall. First section 192 is configured to be placed between cover 114 and housing 108 of thumb throttle 104, while second section 194 is configured to allow finger throttle lever 186 to project therefrom.

Figure 5:
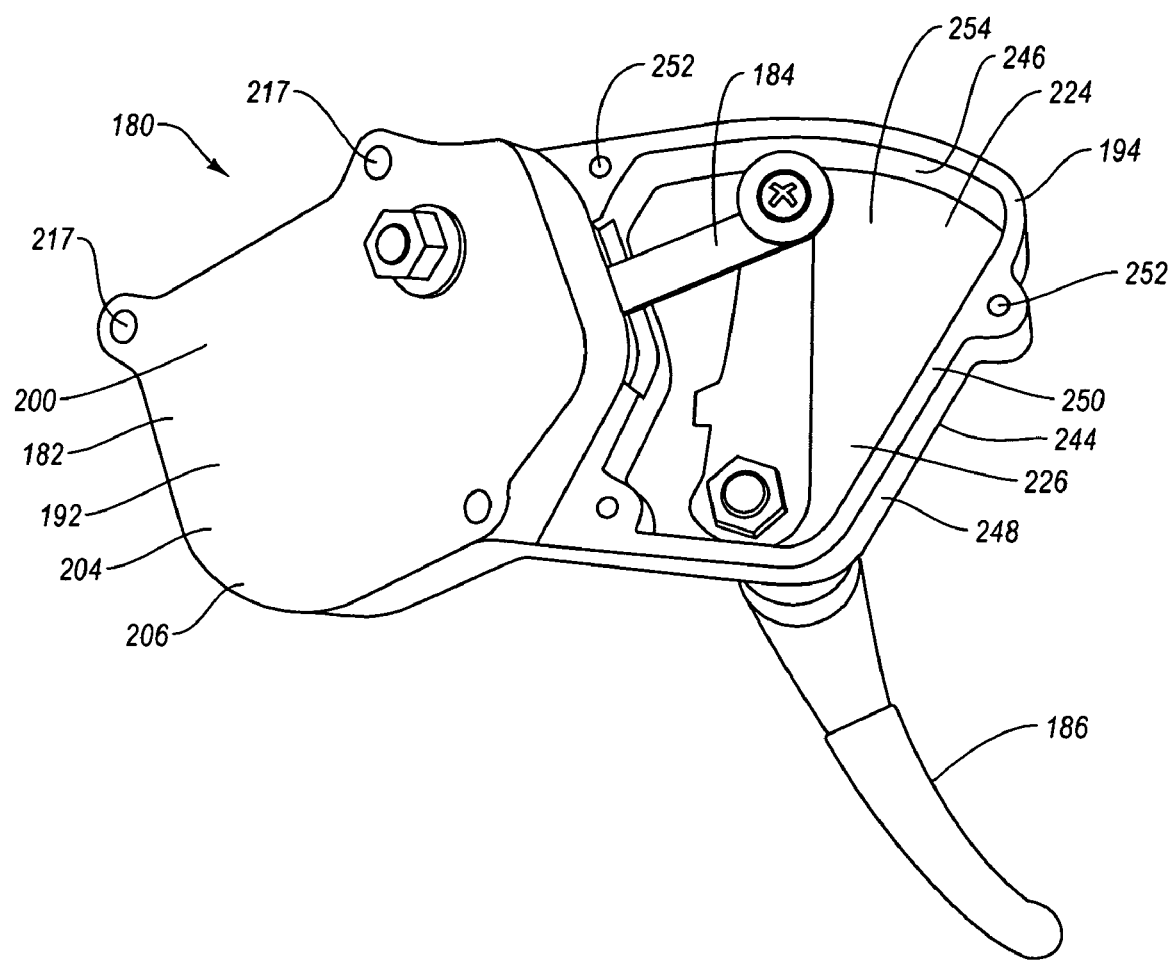
FIG. 5 is a top perspective view of the finger throttle depicted in FIG. 4.
Figure 6:
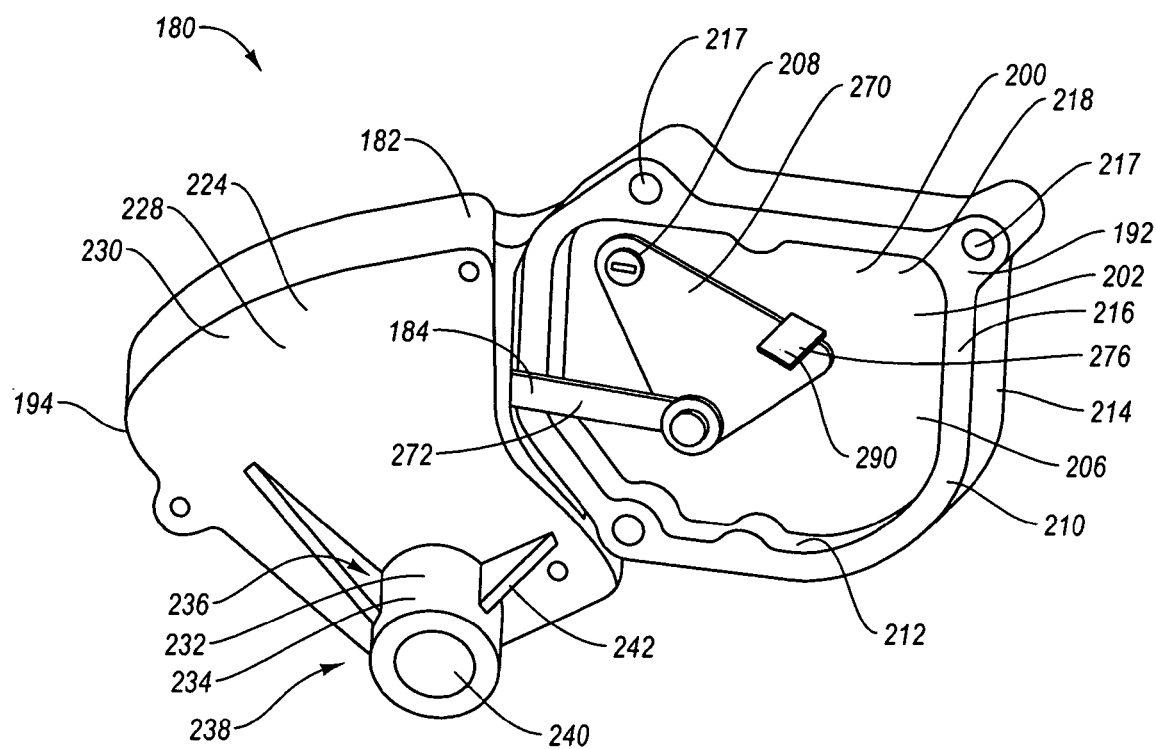
FIG. 6 is a bottom perspective view of the finger throttle depicted in FIG. 4.

Turning to FIGS. 5 and 6, first section 192 has a floor 200 having an interior surface 202 and an opposing exterior surface 204 extending to a perimeter edge 206. Both of the surfaces 202 and 204 are depicted as being substantially planar, although this is not necessarily required, as long as thumb throttle cover 114 can mount on exterior surface 204 at perimeter edge 206. A gasket 190 placed between the first section 192 and the thumb throttle cover 114 can be used to help with the fit. Floor 200 also bounds a hole 208 that extends all the way through floor 200 between interior and exterior surfaces 202 and 204. This hole 208 is used to help define one of the pivot points for the finger throttle linkage 184, as discussed below.

First section 192 also includes a perimeter sidewall 210 that extends substantially normally from interior surface 202 of floor 200 at perimeter edge 206. Perimeter sidewall 210 has an interior surface 212 and an opposing exterior surface 214 that extend from floor 200 to a face 216 that is generally planar within the same plane as the top surface 128 of thumb throttle housing sidewall 118. Perimeter sidewall 210 is sized and shaped so that face 216 will align with top surface 128 when finger throttle 180 is mounted on thumb throttle 104. Perimeter sidewall 210 also includes various through bores 217 that align with the screw holes 137 formed on top surface 128 of the cavity 130 and with the through bores 139 on cover 114 when the finger throttle is assembled therewith.

The interior surfaces 202 and 212 of first section 192 together bound an open cavity 218. It is within this cavity 218 that a portion of the finger throttle linkage assembly 184 is disposed. As discussed below, when finger throttle 180 is mounted on thumb throttle 104, the interior surfaces 120 and 124 of thumb throttle housing 108 and the interior surfaces 202 and 212 of finger throttle housing 182 face towards each other and together bound a larger cavity 220 comprising the cavities 130 and 218 of the respective throttle housings.

Referring still to FIGS. 5 and 6, second section 194 of housing 182 has a floor 224 having an interior surface 226 and an opposing exterior surface 228 extending to a perimeter edge 230. Both of the surfaces 226 and 228 are depicted as being substantially planar, although this is not required. Projecting substantially normally from the exterior surface 228 of floor 224 is a tube-like projection 232. Projection 232 comprises a sidewall 234 extending from a first end 236 located at the intersection with exterior surface 228 to a spaced apart second end 238. Sidewall 234 bounds a bore 240 that extends completely through projection 232 and floor 224. It is through this bore 240 that the finger throttle lever 186 attaches to throttle linkage assembly 184, as discussed in more detail below. Projection 232 may also have one or more ribs 242 attached to floor 224 to strengthen the projection 232 and make it more rigid, although this is not required.

Second section 194 also includes a perimeter sidewall 244 that extends substantially normally from interior surface 226 of floor 224 at perimeter edge 230. Perimeter sidewall 244 has an interior surface 246 and an opposing exterior surface 248 that extend from floor 224 to a face 250 that is generally planar. Perimeter sidewall 244 also includes various threaded screw holes 252 having openings on the top surface for securing cover 188 thereto.

The interior surfaces 226 and 246 of second section 194 together bound an open cavity 254. It is within this cavity 254 that a portion of the finger throttle linkage assembly 184 is disposed.

As shown in FIGS. 4-6, first section 192 and second section 194 of finger throttle housing 180 are disposed so that the cavities 218 and 254 of the sections face in generally opposite directions while portions of sidewalls 210 and 244 form a common wall 260 between the sections. As perhaps best shown in FIG. 4, finger throttle housing 180 is generally disposed such that cavity 218 of first section 192 is facing generally downward toward the cavity 130 of thumb throttle housing 108 when assembled. In contrast, cavity 254 of second section 194 is facing generally upward, to the side of and away from thumb throttle housing 108.

As shown in FIGS. 5 and 6 and noted above, sidewalls 210 and 244 have a shared common wall 260 between them. That is, common wall 260 has a first surface 262 and an opposing second surface 264 that correspond, respectively, to a portion of the interior surface 212 of perimeter sidewall 210 and a portion of the interior surface 246 of perimeter sidewall 244. Common wall 260 bounds an opening 266 extending therethrough between first and second surfaces 262 and 264 so as to provide a passage between cavity 218 of first section 192 and cavity 254 of second section 194. As discussed in more detail below, it is through this opening 266 that finger throttle linkage assembly 184 passes between cavities 218 and 254.

Figure 7:
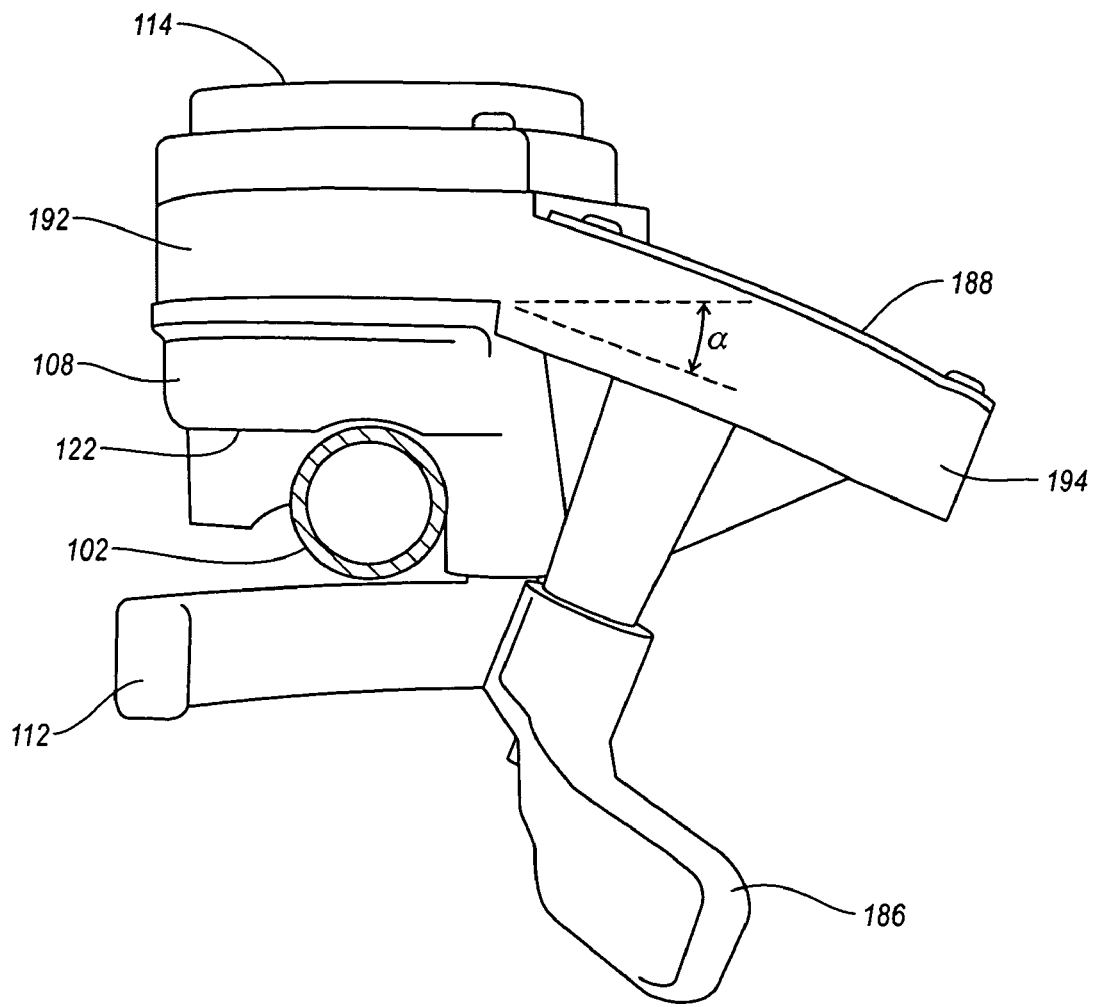
FIG. 7 is a side view of the throttle assembly shown in FIG. 4, assembled and mounted on a handlebar of an ATV.

Sections 192 and 194 of housing 182 can be aligned with each other or, as in the depicted embodiment can be disposed at an angle with each other to better position the finger throttle lever 186 for ease of use. For example, as shown in FIG. 7, section 192 is generally aligned in the same plane as the thumb throttle housing 108, while section 194 is disposed at a slight downward angle therefrom. In some embodiments, section 194 is disposed at an angle α from the plane of the thumb throttle housing 108 of between about 15 degrees and about 45 degrees, with about 20 degrees to about 30 degrees being more common. Other angles are also possible. Housing 182 can be made of hard plastic, metal, or other rigid material.

Returning to FIG. 4, cover 188 has an interior surface 320 and an opposing exterior surface 322. Cover 188 is removably attachable to perimeter sidewall 244 of second section 194 at face 250 so that when attached, interior surface 320 of cover 188 further bounds and encloses cavity 254. In the depicted embodiment, cover 188 also includes various through bores 324 that align with the screw holes 252 formed on face 250 of the perimeter sidewall 244 when the cover 188 is mounted thereon. Cover 188 can be attached to sidewall 244 by inserting screws 326 as are known in the art through the through bores 324 and screwing the screws 326 into screw holes 252. Other fastening or attachment means known in the art can alternatively be used. Although not required, a gasket 190 can also be positioned between the cover 188 and the face 250 of the perimeter sidewall 244 to help seal the connection and/or to provide a better fit. Cover 188 can be made of hard plastic, metal, or other rigid material.

Finger throttle lever 186 is similar to thumb throttle lever 112, except, of course, that it is made for finger actuation. As such, throttle lever 186 comprises a lever arm 302 that is rotatable about a shaft 304. Lever arm 302 extends from a first end 306 to a spaced apart second end 308. Because throttle lever 186 is designed for finger operation, lever arm 302 is generally longer than lever arm 148, although this is not required. Shaft 304 projects substantially normally from first end 306 of lever arm 302, to a spaced apart distal end 310 along a central longitudinal axis 312. A key 314 or other attachment means is disposed at distal end 310 of shaft 304. Throttle lever 186 is positioned so that lever arm 302 is disposed outside of and below second section 194 of housing 182 while shaft 304 passes through passageway bore 240 (see FIG. 6) and into cavity 254 so as to attach to linkage assembly 184. A key 314 or other attachment means are disposed on distal end 310 of shaft 304 to aid in this attachment.

As noted above, linkage assembly 184 is disposed within finger throttle housing 182. As depicted in FIGS. 5 and 6, a portion of linkage assembly 184 is disposed within cavity 218 of first section 192 and a portion of linkage assembly 184 is disposed within cavity 254 of second section 194. As noted above, the two portions come together through opening 266 within common wall 260.

Figure 8A:
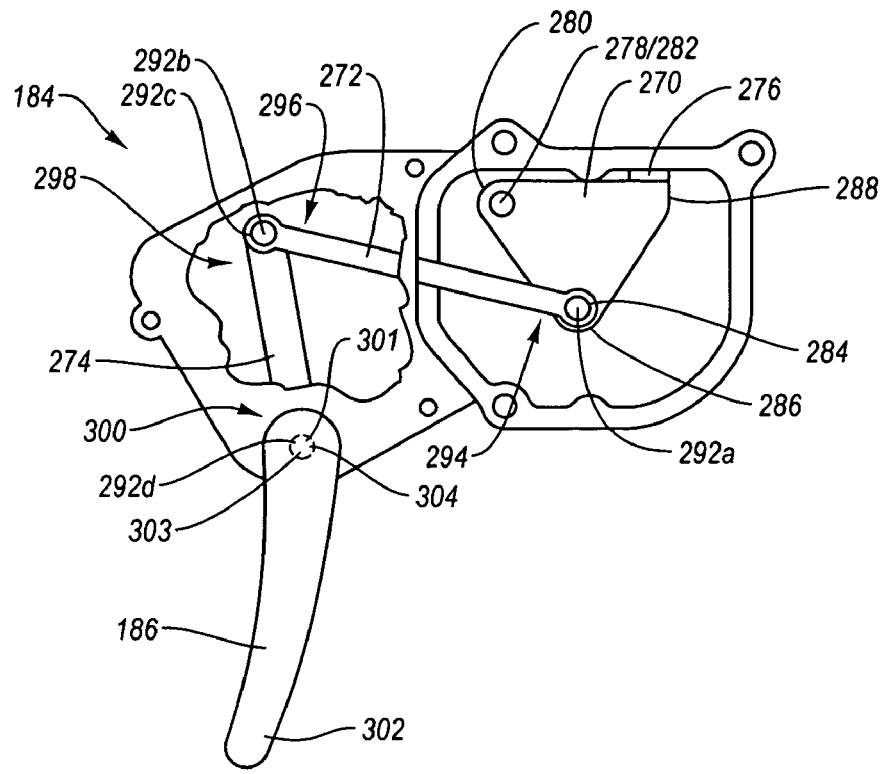
FIGS. 8A and 8B are bottom plan views of the linkage assembly of the finger throttle shown in FIG. 4, respectively showing the linkage assembly in the idle position and the open position.

Turning to FIG. 8A, linkage assembly 184 comprises a pivot plate 270, a first linkage arm 272, and a second linkage arm 274, interconnected so that a projection 276 disposed on pivot plate 270 moves in a particular direction when throttle lever 186 is connected to the linkage assembly 184 and rotated about shaft 304.

Pivot plate 270 is a generally triangular plate having a hole cut out of two of the corners of the triangle for screws or other fasteners to fit through. The first hole 278 is disposed at a first corner 280 of pivot plate 270 and is configured to align with hole 208 formed in floor 200 of first section 192 of finger throttle housing 182. When assembled and attached to the first section 192 of housing 182, first hole 278 acts as a pivot point 282 about which pivot plate 270 rotates. The second hole 284 is disposed at a second corner 286 of pivot plate 270 and is used in coupling pivot plate 270 to the first linkage arm 272. Both the first and second holes 278 and 284 are sized so as to be able to receive a fastener.

Figure 9:
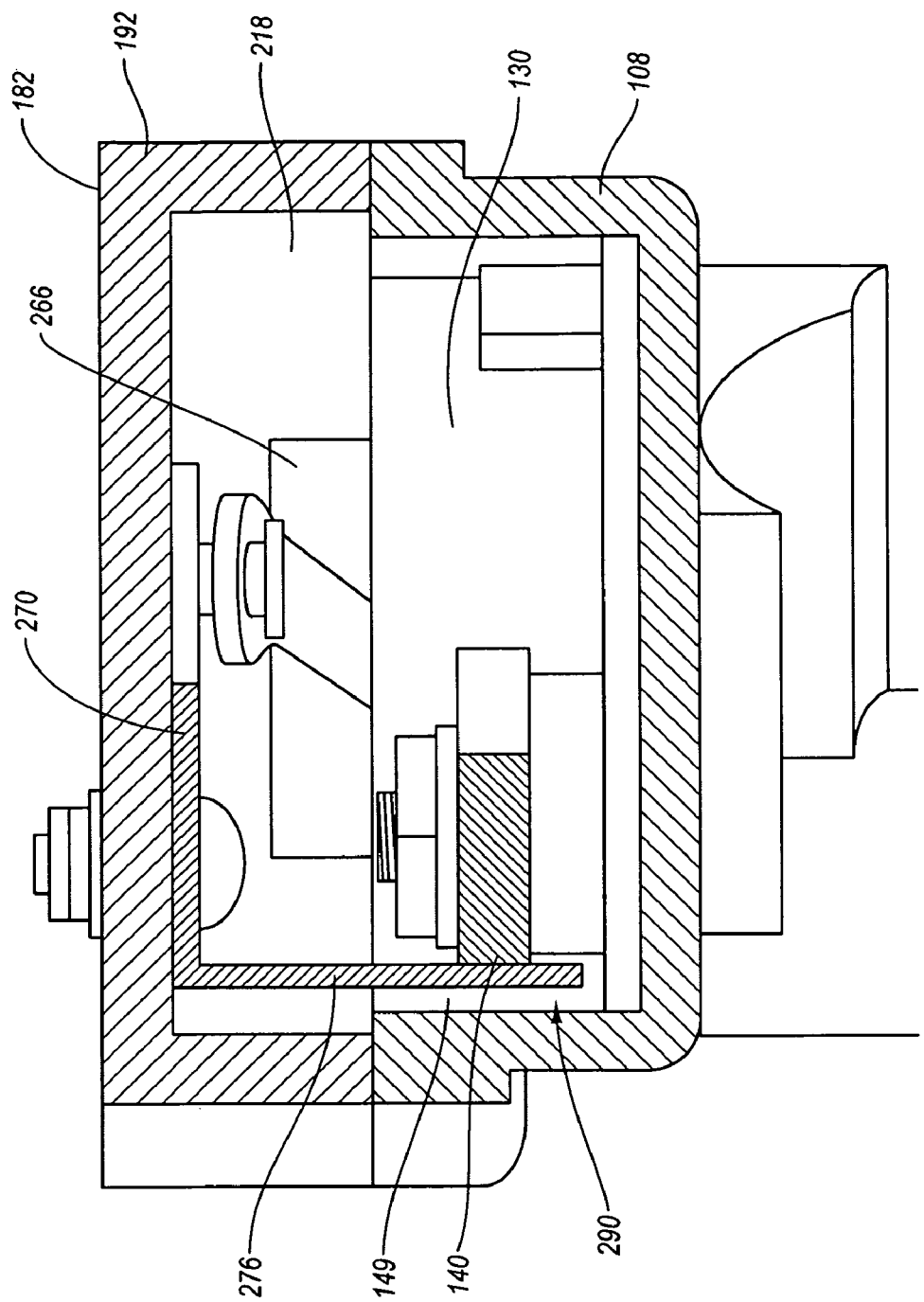
FIG. 9 is a cross sectional back view of a portion of the assembled throttle assembly shown in FIG. 4.

Projection 276 is rigidly disposed at the third corner 288 of pivot plate 270. Turning to FIG. 9 in conjunction with FIG. 8A, projection 276 is a generally flat rigid plate extending substantially normally from pivot plate 270 to a distal end 290. As shown in FIG. 9, projection 276 is designed so that distal end 290 extends from cavity 218 of the first section 192 of finger throttle housing 182 into cavity 130 of thumb throttle housing 108 to engage inner edge 140 of thumb throttle linkage arm 138 when finger throttle 180 is mounted on thumb throttle 104. Projection 276 can be integrally formed with pivot plate 270 or can be attached thereto by welding, fastener, adhesive or the like.

Returning to FIG. 8A, first and second linkage arms 272 and 274 are generally narrow, flat plates having through holes 292 formed in both ends thereof to aid in attaching the linkage arms 272 and 274 to other portions of the linkage assembly 184, to each other, and to the finger throttle lever 186. First linkage arm 272 extends between a first end 294 and a spaced apart second end 296. First end 294 is disposed within cavity 218 of the first section 192 of housing 182 while second end 296 is disposed within cavity 254 of second section 194 of housing 182. To accomplish this, first linkage arm passes through opening 266 formed in common wall 260 between the cavities.

Through hole 292a formed at first end 294 of first linkage arm 272 is aligned with second hole 284 of pivot plate 270 within cavity 218 of first section of housing 182. A screw, bolt, or other fastener is passed through holes 292a and 284 to pivotally attach the first linkage arm 272 to the pivot plate 270. First linkage arm 272 is pivotal about second hole 284 of pivot plate 270 even when attached to pivot plate 270.

Similarly, through hole 292b formed at second end 296 of first linkage arm 272 is aligned with through hole 292c formed at first end 298 of second linkage arm 274 and a screw, bolt, or other fastener is passed therethrough to pivotally attach the first and second linkage arms 272 and 274. Linkage arms 272 and 274 are pivotal about each other even when attached to each other.

Finally, disposed at the second end 300 of second linkage arm 274 is an attachment means 301 that is mateable with the key 314 or other attachment means disposed on shaft 304 of finger throttle lever 186. The attachment means 301 is aligned with bore 240 formed in second section 194 of finger throttle housing 182 so as to be able to rigidly attach to the throttle lever shaft 304. As a result of this attachment, second end 300 of second linkage arm 274 remains disposed over bore 240 while second linkage arm 274 pivots about second end 300. That is, bore 240 acts as a pivot point 303 about which second linkage arm 274 pivots. As noted above, unlike the attachments made at the other through holes 292a-c, the attachment to shaft 304 is designed to be a rigid attachment. As such, when lever arm 302 is pivoted about shaft 304, second linkage arm 274 is also caused to pivot about shaft 304, and vice versa. Linkage arm 274 can be attached to shaft 304 via threaded attachment, adhesive, keyed attachment, or any other types of attachment known in the art.

The pivot plate 270, first linkage arm 272, and second linkage arm 274 are made of metal, hard plastic, alloy, or other material that is able to withstand the pressures put thereon.

The above description of a finger throttle linkage assembly 184 is but one example of throttle assemblies that can be used in the present invention. Other types of throttle assemblies can also be used. For example, one or more cables can be used instead of one or more of the linkage arms 272, 274 in linkage assembly 184.

Having described the individual components of the finger throttle linkage assembly 184, its method of operation is now given.

As shown in FIG. 9 and as noted above, when finger throttle 180 is mounted onto thumb throttle 104, distal end 290 of projection 276 extends from cavity 218 into cavity 130 of thumb throttle housing 108 and engages inner edge 140 of thumb throttle linkage arm 138.

As noted above, the engine can be throttled between idle and fully open. The position of thumb throttle linkage arm 138 corresponding to these is given as "A" and "B", respectively, in FIG. 3. When thumb throttle linkage arm 138 is in idle position A, finger throttle linkage assembly 184 is in the position depicted in FIG. 8A and FIG. 9. In this idle position, projection 276 is disposed in the narrow space 149 between inner edge 140 of thumb throttle linkage arm 138 and interior surface 124 of perimeter sidewall 118 of thumb throttle housing 108. Pivot plate 270, first linkage arm 272, second linkage arm 274 and lever 186 are all positioned as shown in FIG. 8A. Note that FIGS. 8A and 8B are plan views of the throttle linkage assembly 184 as viewed from underneath finger throttle 180.

Figure 8B:
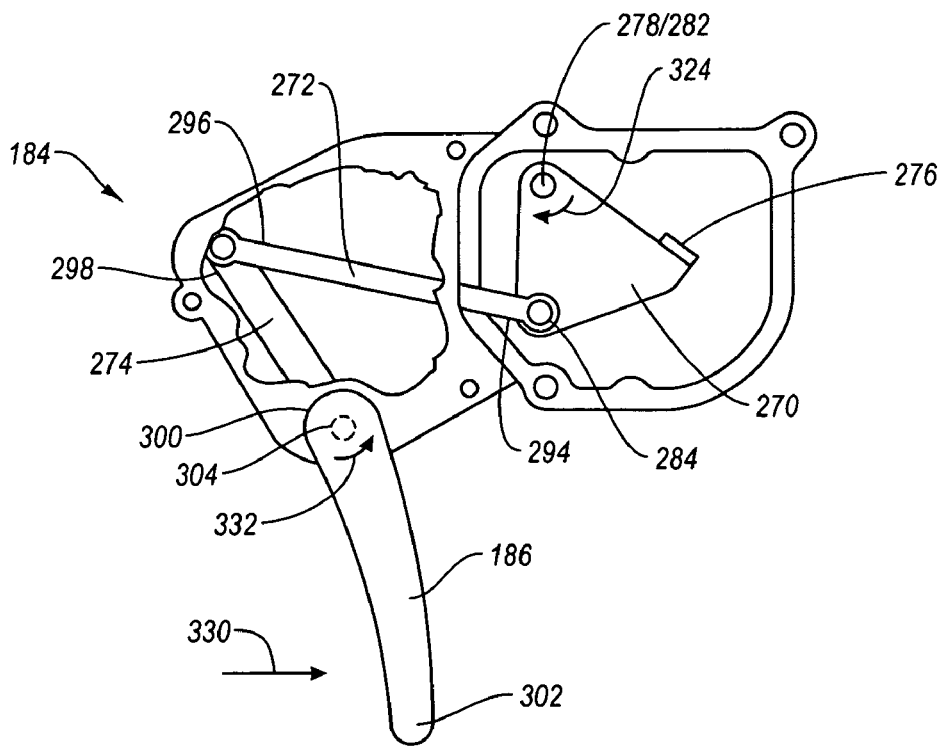

Turning to FIG. 8B, when the operator desires to go faster, the operator pushes on lever arm 302 with his fingers in the direction denoted by arrow 330. This causes lever arm 302 to pivot about shaft 304 in the counterclockwise direction denoted by arrow 332. Because the second end 300 of second linkage arm 274 is rigidly connected to shaft 304, second linkage arm also rotates about shaft 304. As a result, first end 298 of second linkage arm 274 and second end 296 of first linkage arm 272 which is attached thereto, are caused to move further away from pivot plate 270. Because first end 294 of first linkage arm 272 is attached to second hole 284, pivot plate also moves with the movement of first linkage arm 272.

However, because pivot plate 270 is pivotally attached to finger throttle housing 182 at first hole 278, the movement of first linkage arm 272 causes pivot plate 270 to pivot about pivot point 282 in the clockwise direction shown by arrow 334 so that second hole 284 can also move with first linkage arm 272. Thus, pivot plate 270 rotates in a direction opposite to the direction of rotation of lever 186. As a result of the rotation of pivot plate 270, projection 276 is caused to also rotate about pivot point 282.

As noted above, projection 276 biases against inner edge 140 of thumb throttle linkage arm 138, as shown in FIG. 9. Because of this, when pivot plate 270 rotates about pivot point 282, projection 276 pushes on thumb throttle linkage arm 138 so as to cause linkage arm 138 to rotate about shaft 154 of thumb throttle lever 112, similar to when using thumb throttle lever 112.

If the operator desires to open up the engine throttle as much as possible to go as fast as possible, the operator pushes the finger throttle lever arm 302 to rotate in the direction of arrow 332 to the fully open position, shown in FIG. 8B. As a result, projection 276 rotates in the opposite direction, as discussed above, to the fully open position. This causes thumb throttle linkage arm 138 to move to position "B" shown in FIG. 3, causing cable 135 to be moved to the position that will cause the throttle to the engine to allow the largest amount of gas, as discussed above. To decelerate, the operator simply releases pressure on the finger throttle lever arm 302 and the spring or other biasing device within the thumb throttle 104 causes the thumb throttle linkage arm 138 to rotate back as the projection 276 is rotated back (i.e. in the opposite direction of arrow 334) towards the idle position shown in FIG. 8A. Because of its attachment through linkage assembly 184, finger throttle lever arm 302 also rotates back to the idle position shown in FIG. 8A.

A method of adding a finger throttle to an ATV or other motorized vehicle having a thumb throttle is now given. Note the ease of doing so. As noted above, most ATVs, snowmobiles, and personal watercraft come equipped with a thumb throttle 104 similar to the one described herein. The first step to adding a finger throttle to the vehicle is to remove the thumb throttle cover 114 from the existing thumb throttle housing 108. This is typically done by loosening and removing screws 141 that extend through through bores 139 and into screw holes 137 of thumb throttle housing 108. Once the screws 141 have been removed, the throttle cover 114 is then lifted off the thumb throttle housing 108.

The first section 192 of finger throttle housing 182 is then aligned over thumb throttle housing 108 so that face 216 of perimeter sidewall 210 of finger throttle housing 182 faces and abuts top surface 126 of perimeter sidewall 118 of thumb throttle housing 108. In this manner, cavities 130 and 218 face each other to form a larger cavity 218. As shown in the embodiment depicted in FIG. 4, a gasket 190 can be placed between the finger throttle housing 182 and the thumb throttle housing 108, if desired. When finger throttle housing 182 is positioned thusly, through bores 217 of finger throttle housing 182 are aligned with screw holes 137 of thumb throttle housing 108.

After the finger throttle 180 has been positioned, the throttle cover 114 is positioned over the first section 192 of finger throttle housing 182 so that the through bores 139 of throttle cover 114 are aligned with the through bores 217 of finger throttle housing 182. Longer screws 336 are then inserted through through bores 139 and 217 and screwed into screw holes 137 to secure the throttle cover 114, the finger throttle housing 182, and the thumb throttle housing 108 together, as shown in FIG. 7.

The cover 188 is also attached to the face 250 of the second section 194 of finger throttle 180 via screws 326 or other attachment method, as described above. Attaching the cover 188 to the second section 194 can be done before, during, or after finger throttle 180 is positioned and attached to thumb throttle 104.

Figure 10A:
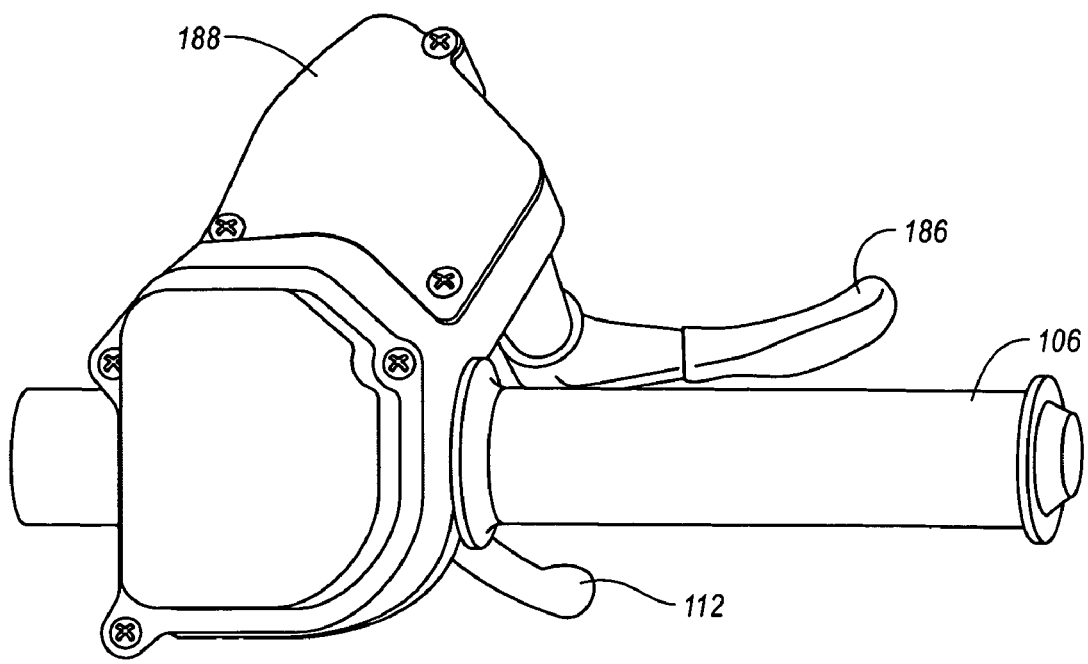
FIGS. 10A and 10B are top perspective views of the throttle assembly shown in FIG. 4, assembled and mounted on a handlebar of an ATV and showing the positions of the thumb throttle lever and the finger throttle lever in the idle positions (FIG. 10A) and in the open positions (FIG. 10B).
Figure 10B:
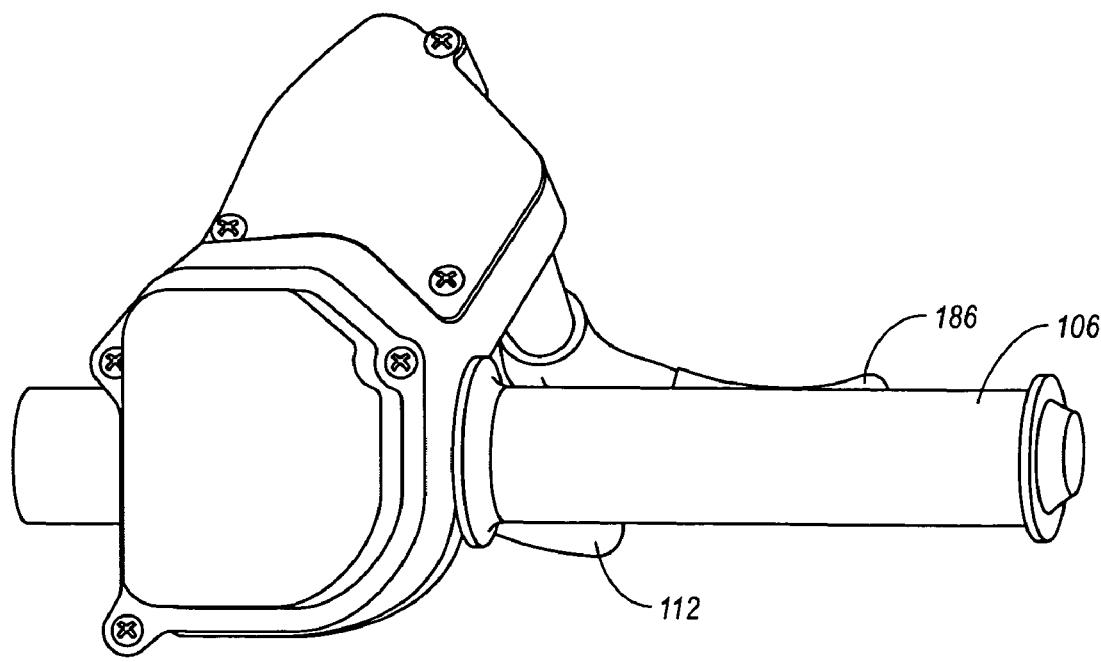

As shown in FIG. 7, when the first section 192 of finger throttle housing 182 has been secured to the thumb throttle as described above, the second section 194 of finger throttle housing 182 extends in front of handgrip 106 and angles slightly down form first section 192. This causes finger throttle lever arm 302, which extends out the bottom of second section 194, to be positioned below and in front of the hand grip 106 and to be angled for easy manipulation by the operator's fingers. This is in contrast to the thumb throttle lever arm 148, which, while also being positioned below the hand grip 106, is positioned behind the hand grip 106. Due to this positioning, the operator As noted above, finger throttle 180 is designed so that the finger throttle lever 186 is rotated in the opposite direction as the thumb throttle linkage arm 138 and thumb throttle lever 112 connected thereto. As such, the finger throttle lever 186 and the thumb throttle lever 112 are pushed in opposite directions by the fingers and thumb to produce the same action on thumb throttle linkage arm 138. This is clearly shown in FIGS. 10A and 10B, which depict the position of levers 112 and 186 in the idle position (FIG. 10A) and the fully open position (FIG. 10B). Thus, to accelerate, the operator either pushes the thumb throttle lever 112 forward or the finger throttle lever 186 backward. Because the levers 112 and 186 are on opposite sides of the hand grip 106, the levers are pushed toward each other to open the throttle.

Because of the design and positioning of finger throttle 180, the operator can continue to use the thumb throttle lever 112 to control the engine when finger throttle 180 is installed. Alternatively, the operator can use finger throttle lever 186 to control the engine. The operator also has a third option: the operator can use a combination of the two levers. That is, the operator can use the thumb to push on the thumb throttle lever 186 while simultaneously using his fingers to push on the finger throttle lever 186 to control the engine. To do this, the operator simply pushes the levers toward each other via the thumb and fingers in a normal range of motion. This divides the pressure between the thumb and the fingers to provide less pressure on each.

Also, because both levers 112 and 186 are located below the thumb grip 106 and the levers 112 and 186 are pushed toward each other to open the throttle, the operator maintains contact with the hand grip with his palm while manipulating both levers 112 and 186 at the same time.

Due to the positioning of the lever arms 148 and 302 below the hand grip 106, in some embodiments, each of the levers can be positioned in the respective idle and open positions so as to not contact the hand grip 106. Furthermore, in some embodiments each of the lever arms 148 and 302 can be moved between the idle and open positions without the lever arms 148 and 302 contacting the hand grip 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A finger throttle for a motorized vehicle, the motorized vehicle having a handgrip with a thumb throttle disposed thereon or thereby, the thumb throttle having a thumb operated lever operationally coupled to a thumb throttle linkage assembly disposed within a thumb throttle housing, the finger throttle comprising:
    a first housing configured to mount on the thumb throttle housing;
    a first linkage assembly at least partially disposed within the first housing, the first linkage assembly being configured to engage the thumb throttle linkage assembly disposed within the thumb throttle housing; and
    a finger operated lever at least partially disposed outside of the first housing, the finger operated lever being operationally linked to the first linkage assembly such that the thumb throttle linkage assembly is caused to move by the finger operated lever.

2. A finger throttle as recited in claim 1, wherein the first linkage assembly comprises a projection configured to engage the thumb throttle linkage assembly within the thumb throttle housing.

3. A finger throttle as recited in claim 1, wherein the first linkage assembly comprises a plurality of linkage arms operationally coupled together.

4. A finger throttle as recited in claim 1, wherein the first housing has two pivot points about which different portions of the first linkage assembly rotate, the points being fixed in relation to the first housing.

5. A finger throttle as recited in claim 1, wherein the first linkage assembly comprises a cable.

6. A finger throttle as recited in claim 1, wherein the first housing comprises two sections each having a cavity, the cavities generally facing in opposite directions, the first linkage assembly being at least partially disposed in both cavities.

7. A finger throttle as recited in claim 6, wherein the first housing further comprises a wall separating the cavities, the wall bounding an opening between the cavities through which a portion of the first linkage assembly passes.

8. A finger throttle as recited in claim 1, wherein the finger operated lever is movable between a first idle position and a first open position, and wherein the projection is movable between a second idle position and a second open position, the projection being moved between the second idle and second open positions in response to the finger operated lever being moved between the first idle and first open positions.

9. A finger throttle as recited in claim 8, wherein the finger operated lever is configured to avoid contact with the handgrip when in the first open and first idle positions and while being moved therebetween.

10. A motor vehicle comprising a throttle as recited in claim 1.

11. A motor vehicle as recited in claim 10, wherein the motor vehicle comprises one of: an all terrain vehicle (ATV), a snowmobile, and a personal water craft.

12. A throttle assembly for a motorized vehicle having a handgrip, the throttle assembly comprising:
    a thumb throttle comprising:
        a first housing;
        a first linkage assembly disposed within the first housing; and
        a thumb operated lever at least partially disposed outside of the first housing, the thumb operated lever being attached to the first linkage assembly such that the first linkage assembly is caused to move by movement of the thumb operated lever; and
    a finger throttle comprising:
        a finger operated lever operationally engaged with the first linkage assembly such that the first linkage assembly of the thumb throttle is also caused to move by movement of the finger operated lever.

13. A throttle assembly as recited in claim 12, wherein the first housing bounds a first cavity in which the first linkage assembly is disposed, and wherein the first linkage assembly is caused to move within the first cavity by the thumb operated lever and by the finger operated lever.

14. A throttle assembly as recited in claim 12, wherein the finger throttle further comprises:
    a second housing; and
    a second linkage assembly at least partially disposed within the second housing, the second linkage assembly engaging the first linkage assembly within the first housing.

15. A throttle assembly as recited in claim 14, wherein the second linkage assembly is unsecured to the first linkage assembly when the second linkage assembly engages the first linkage assembly.

16. A throttle assembly as recited in claim 14, wherein the second housing is secured to the first housing.

17. A throttle assembly as recited in claim 14, wherein the first housing bounds a first cavity in which the first linkage assembly is disposed and the second housing bounds a second cavity in which the second linkage assembly is disposed, the first and second cavities together forming a third enclosed cavity bounded by the first and second housings.

18. A throttle assembly as recited in claim 12, wherein the finger operated lever is movable between an open position and a closed position, the finger operated lever being configured to avoid contact with the handgrip when in the open and closed positions and while being moved therebetween.

19. A throttle assembly as recited in claim 18, wherein the thumb operated lever is configured to be disposed below and behind the handgrip and the finger operated lever is configured to be disposed below and in front of the handgrip.

20. A method of controlling an engine of a motorized vehicle, the motorized vehicle having a handgrip with a thumb throttle disposed thereon or thereby, the method comprising:
    mounting a housing of a finger throttle to a housing of the thumb throttle; and
    actuating a finger operated lever of the finger throttle and a thumb operated lever of the thumb throttle concurrently while maintaining a grip on the handgrip to control the engine.

21. The method as recited in claim 20, further comprising:
    removing a cover of the thumb throttle from the thumb throttle housing before mounting the finger throttle housing to the thumb throttle housing; and
    mounting the thumb throttle cover to the finger throttle housing after mounting the finger throttle housing to the thumb throttle housing.

* * * * *